US006690802B2

(12) United States Patent
Stickles et al.

(10) Patent No.: US 6,690,802 B2
(45) Date of Patent: Feb. 10, 2004

(54) ADJUSTABLE SPEAKER BOX FOR THE SPORTS BAR OF A VEHICLE

(75) Inventors: George C. Stickles, Thornton, CO (US); Frank A. Borke, Windsor, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 10/045,312

(22) Filed: Oct. 24, 2001

(65) Prior Publication Data

US 2003/0076964 A1 Apr. 24, 2003

(51) Int. Cl.[7] ............................ H04B 1/00; H04R 5/02; H04R 1/02

(52) U.S. Cl. ......................... 381/86; 381/302; 381/386; 381/387

(58) Field of Search ............................ 381/86, 24, 302, 381/189, 386, 387, 389, 390; 181/148–150, 198–199

(56) References Cited

U.S. PATENT DOCUMENTS 4,974,759 A * 12/1990 McDonough ............... 224/443
5,094,316 A 3/1992 Rosen
5,608,806 A * 3/1997 Hinojosa ..................... 381/86
5,979,590 A 11/1999 Telmos

* cited by examiner

*Primary Examiner*—Forester W. Isen
*Assistant Examiner*—Elizabeth McChesney

(57) ABSTRACT

A speaker box for a sport utility vehicle. The speaker box is pivotally mounted to the sports bar of the vehicle and can be selectively pivoted relative to the bar to a plurality of positions. In one position, the sound from the speakers of the speaker box is directed downwardly as in convention designs. However, unlike conventional designs, the speaker box and its sound can also be directed rearwardly of the vehicle for parties and other gatherings such as at campsites or on the beach. Further, the speaker box and its sound can be directed slightly forward toward the front of the vehicle if desired. In doing so, a saddle or cutout is provided in the middle of the speaker box so as not to unduly inhibit the driver's vision through the rear view mirror.

27 Claims, 8 Drawing Sheets

ADJUSTABLE SPEAKER BOX FOR THE SPORTS BAR OF A VEHICLE

BACKGROUND OF THE INVENTION

1. Field of the Invention

This invention relates to the field of speaker boxes for sport utility vehicles and more particularly to the field of speaker boxes mountable to the sports bar of such vehicles.

2. Discussion of the Background

Speaker boxes are commonly mounted to the sports bar of sport utility vehicles to provide music and other audio entertainment for the driver and passengers. Currently, such speaker boxes are mounted to extend across the sports bar in a fixed, horizontal position. In use, the sound from the speakers is then only directed downwardly and cannot be adjusted. At outdoor parties or other gatherings in which it is desirable to use the speakers to provide entertainment to the people gathered around the vehicle (such as at a campsite or on the beach) this can be a drawback. That is, because the speakers are fixed in place and their sound is directed downwardly into the deck or cabin area of the vehicle, the music or other audio heard by the party goers around the vehicle is often muted and distorted.

With this and other drawbacks in mind, the present invention was developed. With it, an arrangement is provided for pivotally mounting the speaker box to the sports bar so the sound from the speakers can be directed as desired. In one position, the sound can be directed downwardly as in current designs. However, unlike current designs, the speaker box of the present invention can also be positioned to direct its sound to the rear of the vehicle or even slightly toward the front of the vehicle if desired. In the rearwardly facing position, the sound is delivered without obstruction to the people gathered behind the vehicle. In the slightly forward position, the sound from the speaker box of the present invention is clearer to the driver and front passengers as they travel in the vehicle. In this forward position, a saddle or cutout is provided in the middle section of the speaker box so the driver can still clearly see passed the speaker box through the rear view mirror.

SUMMARY OF THE INVENTION

This invention involves a speaker box for a sport utility vehicle. The speaker box is pivotally mounted to the sports bar of the vehicle and can be selectively pivoted relative to the bar to a plurality of positions. In one position, the sound from the speakers of the speaker box is directed downwardly as in convention designs. However, unlike conventional designs, the speaker box and its sound can also be directed rearwardly of the vehicle for parties and other gatherings such as at campsites or on the beach. Further, the speaker box and its sound can be directed slightly forward toward the front of the vehicle if desired. In doing so, a saddle or cutout is provided in the middle of the speaker box so as not to unduly inhibit the driver's vision through the rear view mirror.

BRIEF DESCRIPTION OF THE DRAWINGS

FIG. 8 also illustrates a safety stop built into the adjustment mechanism to limit how far the speaker box can be pivoted forwardly.

DETAILED DESCRIPTION OF THE INVENTION

Figure 1:
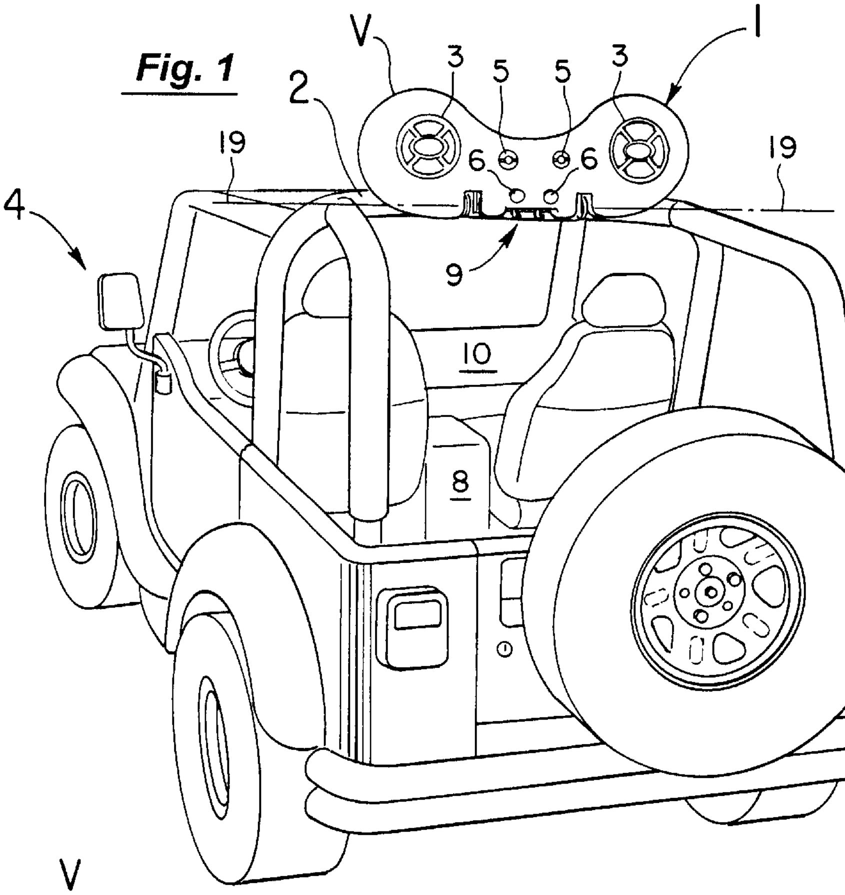
FIG. 1 is a perspective view of the speaker box of the present invention mounted in its up or vertical position on the sports bar of a vehicle. In this position, the full sound of the speaker box can be directed rearwardly of the vehicle for enjoyment by people gathered behind the vehicle such as at a campsite or on the beach.
Figure 8:
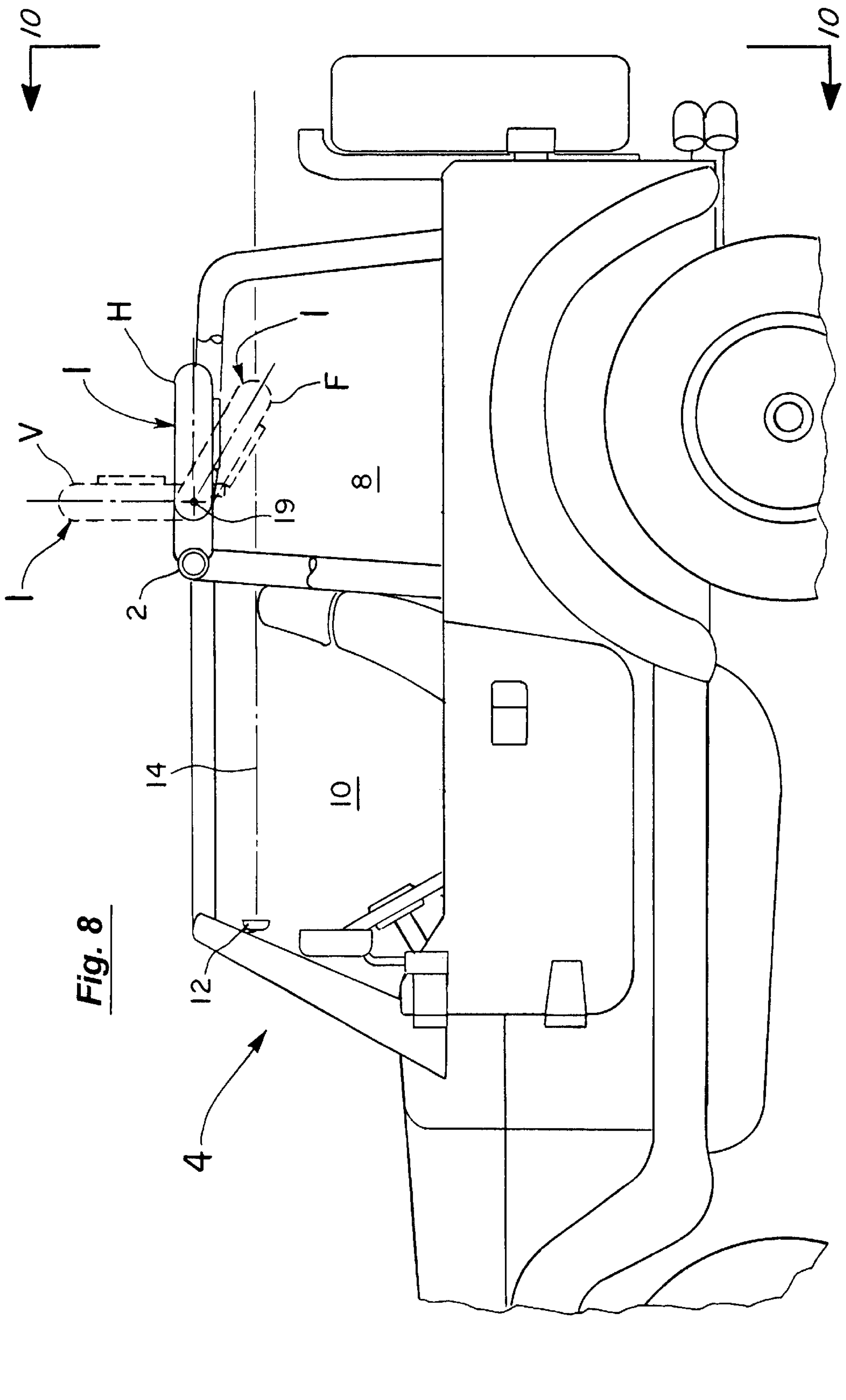
FIG. 8 illustrates a variety of positions in which the speaker box of the present invention can be pivotally moved relative to the sports bar to direct the sound as desired.

As shown in FIGS. 1 and 8, the dual speaker box 1 of the present invention is mounted on the sports bar 2 of the vehicle 4 for pivotal movement to a variety of positions. Normally, the speaker box 1 is supported substantially horizontally in the position H as shown in solid lines in FIG. 8. However, with the present invention, the speaker box 1 can be pivoted to a number of other positions as desired including the up or vertical position V illustrated in FIG. 1.

In the vertical position V of FIG. 1, the high frequency speakers 3 and mid-frequency/bass ports 5 of the speaker box 1 as well as the dome lights 6 are directed substantially rearwardly of the vehicle 4. In contrast and in the normal horizontal position H of FIG. 8, the high frequency speakers 3 and mid-frequency/bass ports 5 of the speaker box 1 as well as the dome lights 6 are directed substantially downwardly. In doing so, the speaker box 1 as shown in full lines in FIG. 8 then assumes an essentially out-of-the way location for maximum use of the interior space of the vehicle 4. This position H also permits any removable soft or hard top to be placed on the vehicle 4. However, with the pivoting arrangement of the present invention as indicated above, the speaker box 1 is not limited to this horizontal position H in FIG. 8 as in conventional designs. Rather, the speaker box 1 of the present invention can be adjusted, for example, to the up or vertical position V in FIGS. 1 and 2 to direct the sound from the box 1 rearwardly of the vehicle 4. This is a particularly desirable option for outdoor parties and gatherings at campsites, the beach, and similar locations as the sound can be directed in an unobstructed manner at the party goers. That is, instead of having the sound directed primarily downwardly into the deck 8 and/or cabin area 10 of the vehicle 4 as in conventional designs and be somewhat muted and distorted, the speaker box 1 can be pointed directly at the gathering to deliver a clear and unobstructed sound to the party goers.

Figure 2:
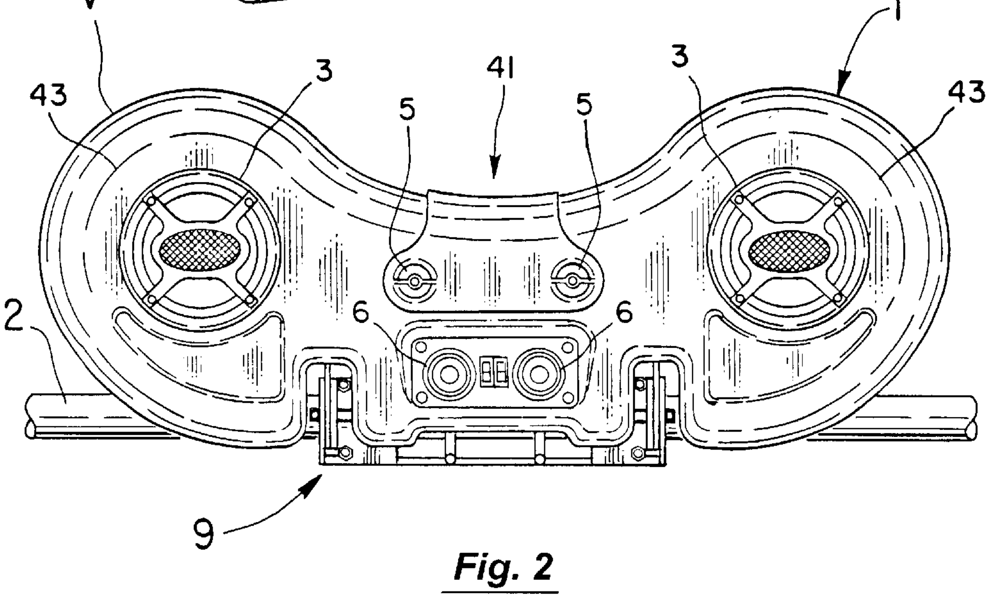
FIG. 2 is an enlarged, rear elevational view of the speaker box of FIG. 1 in its up or vertical position.
Figures 3, 4, 5:
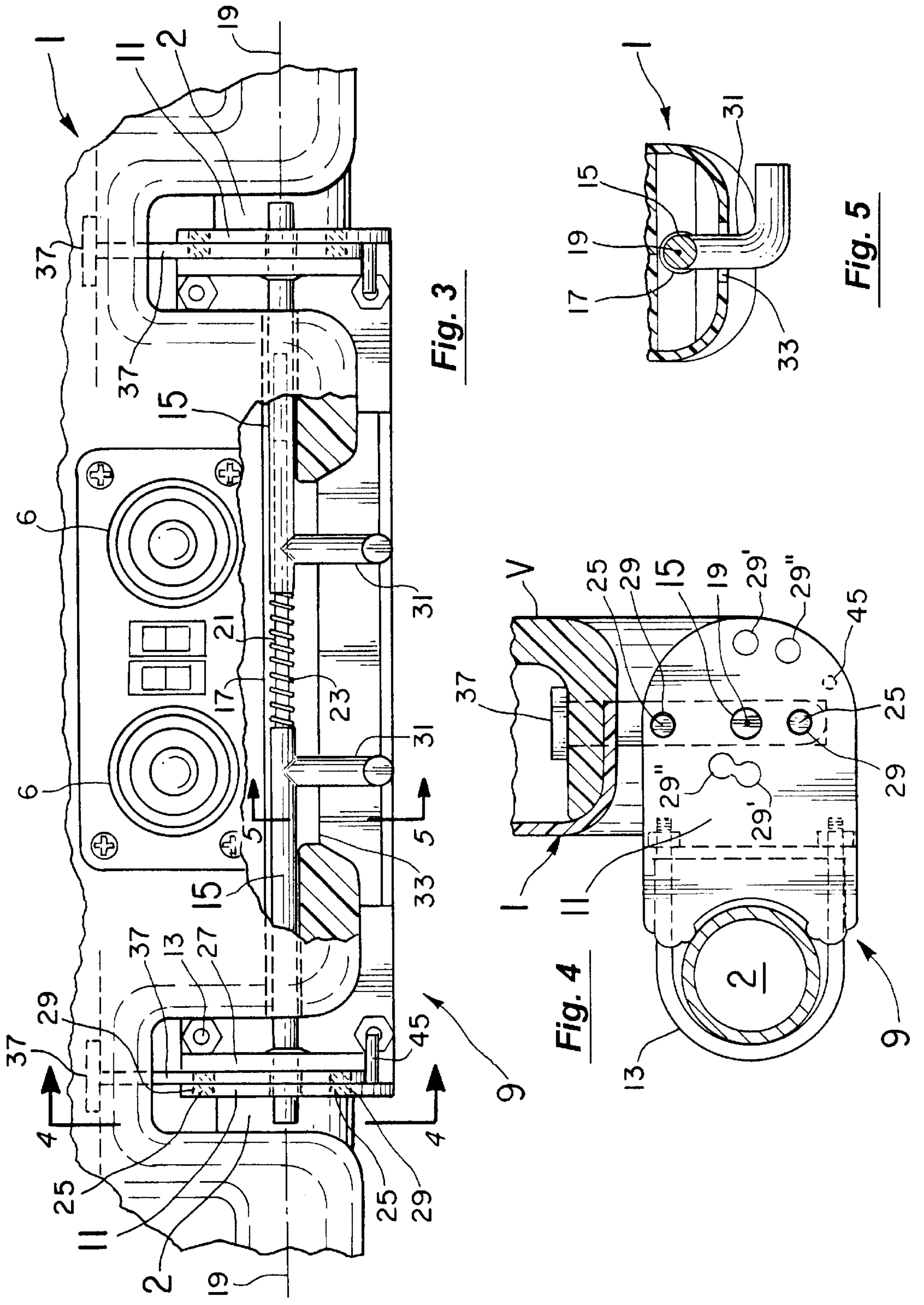
FIG. 3 is a partially cutaway view of the adjustment mechanism for the speaker box that allows the speaker box to be selectively pivoted to its various positions on the sports bar.
FIG. 4 is a view taken along line 4—4 of FIG. 3.
FIG. 5 is a view taken along line 5—5 of FIG. 3.

To accomplish this, the speaker box 1 as shown in FIG. 2 is mounted by the adjustable mechanism 9 to the sports bar 2. As perhaps best seen in the partially cutaway view of FIG. 3 and in the side view of FIG. 4, the adjustable mechanism 9 includes a plate member 11 on each of its sides that is fixedly attached by a C-clamp 13 (see FIG. 4) to the sports bar 2. A rod member 15 is then provided on each half of the adjustable mechanism 9 as shown in FIG. 3. Each rod 15 is mounted in the channel 17 in the speaker box 1 for sliding movement along the collinear, longitudinal axes 19 of the rods 15. More specifically as illustrated in FIG. 3, the rods 15 are hollow along part of their lengths and are concentrically mounted on the inner post member 21. In this manner, the coil spring 23 can be positioned as shown to bias the two rods 15 apart to the position of FIG. 3. Referring to the left side of FIG. 3 and as is explained in more detail below, the two detents 25 on the cross piece 27 in this view are engaged in the corresponding pair of holes 29 in the fixed plate 11 (see also FIG. 4). The speaker box 1 is then firmly secured in the up or vertical position V of FIGS. 1–4 with the speakers 3 and ports 5 as well as the dome lights 6 (see FIG. 1) facing rearwardly of the vehicle 4.

Figures 6, 7:
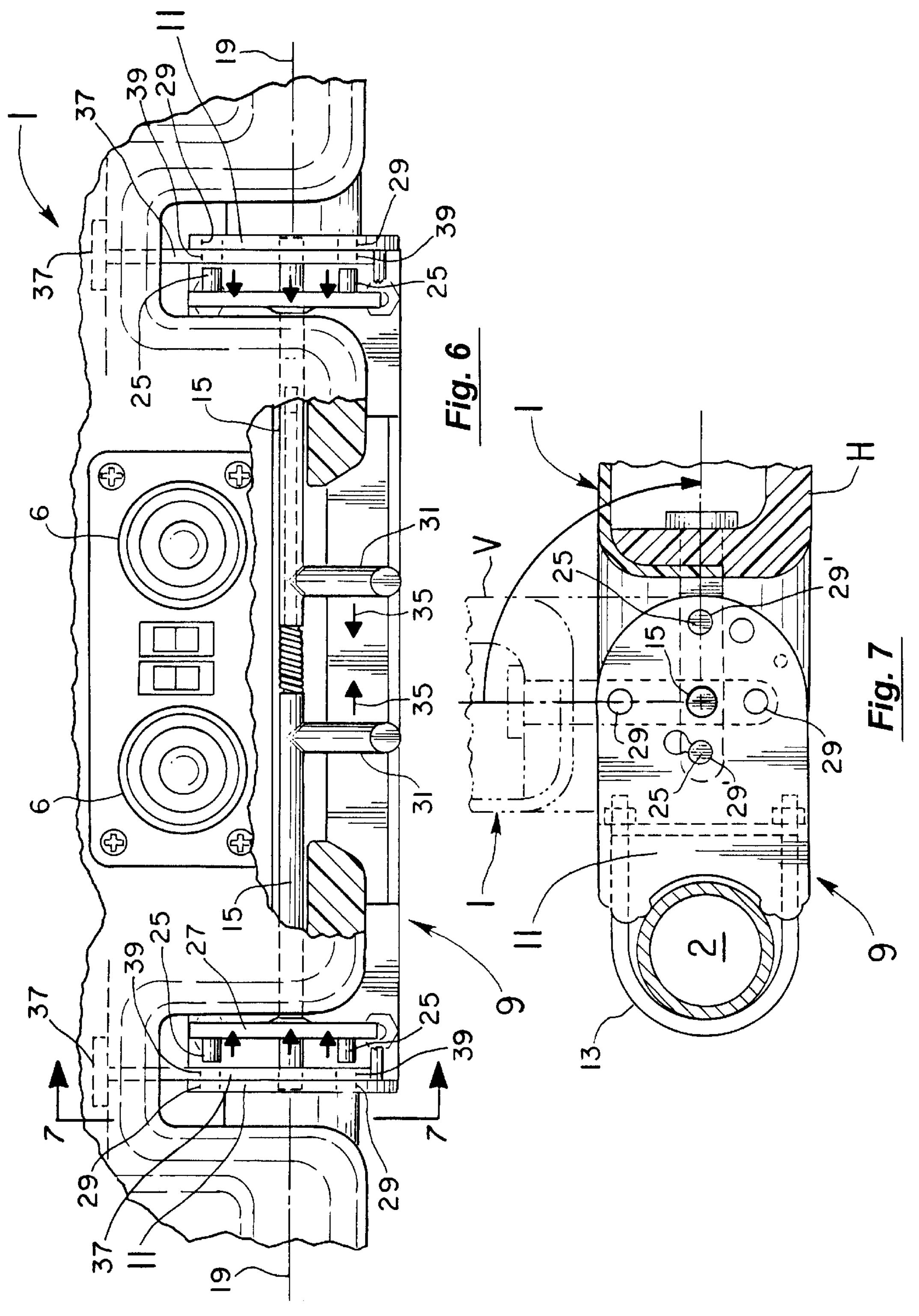
FIG. 6 is a view similar to FIG. 3 illustrating the manner in which the handle members of the adjustment mechanism can be squeezed together to enable the speaker box to be moved to a number of different positions such as the horizontal one shown in full lines in FIGS. 7 and 8.
FIG. 7 is a view taken along line 7—7 of FIG. 6 showing how the speaker box 1 can be moved from its vertical position of FIG. 6 to a horizontal position.

Each rod 15 as shown in FIG. 5 has a handle 31 extending outwardly of the rod 15 and its axis 19. This handle 31 as illustrated sticks through the opening at 33 in the speaker box 1 so the handles 31 can be manually grasp and manipulated to adjust the mechanism 9. More specifically and in operation as best seen in reference to FIGS. 1 and 6, the pair of handles 31 can be manually squeezed together in the direction of arrows 35 in FIG. 6. This movement slides the rods 15 together and withdraws or disengages the detents 25 on the respective cross pieces 27 from the holes 29 in each fixed plate 11 (see FIG. 6). In this withdrawn or disengaged position of FIG. 6, the speaker box 1 can be rotated about the axis 19 toward a second position such as the horizontal position H shown in full lines in FIG. 7. Releasing the handles 31 will then bias and move the cross pieces 27 (which are fixed to the respective rods 15) outwardly under the force of the spring member 23. Once the detents 25 on each cross piece 27 are rotated to be aligned with the horizontal pair of holes 29' in each plate 11 as illustrated in FIG. 7, the detents 25 will move or snap outwardly to be received in the horizontally spaced holes 29'. In this manner, the speaker box 1 is then firmly secured in the horizontal position H of FIG. 7.

It is noted as illustrated in FIGS. 3–4 and 6–7 that the speaker box 1 is mounted by support pins or members 37 on the respective rods 15. The main body of each support member 37 (see FIGS. 3 and 6) is positioned between the plate member 11 on each side of the speaker box 1 and the respective cross piece 27. In operation to rotate the speaker box 1 about the axis 19 from the position of FIG. 3, the detents 25 are withdrawn or disengaged (see FIG. 6) not only from the pair of holes 29 in the respective plate 11 but also from the aligned pair of holes 39 in the respective support member 37. The support member 37 on each side and the respective rod 15 are not fixed to each other and the rods 15 as shown in FIGS. 3 and 6 can slide along the axis 19 relative to the support members 37. However, the rotation of the speaker box 1 about the axis 19 will move both the support members 37 and the rods 15 (as well as the cross pieces 27 fixed to the rods 15). The rods 15 with the cross pieces 27 and detents 25 are thus the catch and release arrangements to firmly secure the support members 37 of the speaker box 1 to the respective plate members 11. The plate members 11 in turn are then fixedly attached to the sports bar 2 as discussed above. In this regard, each support member 37 and each arrangement of rod 15, cross piece 27, and detents 25 are thus respectively engagable and disengagable with the respective plate member 11.

Figure 9:
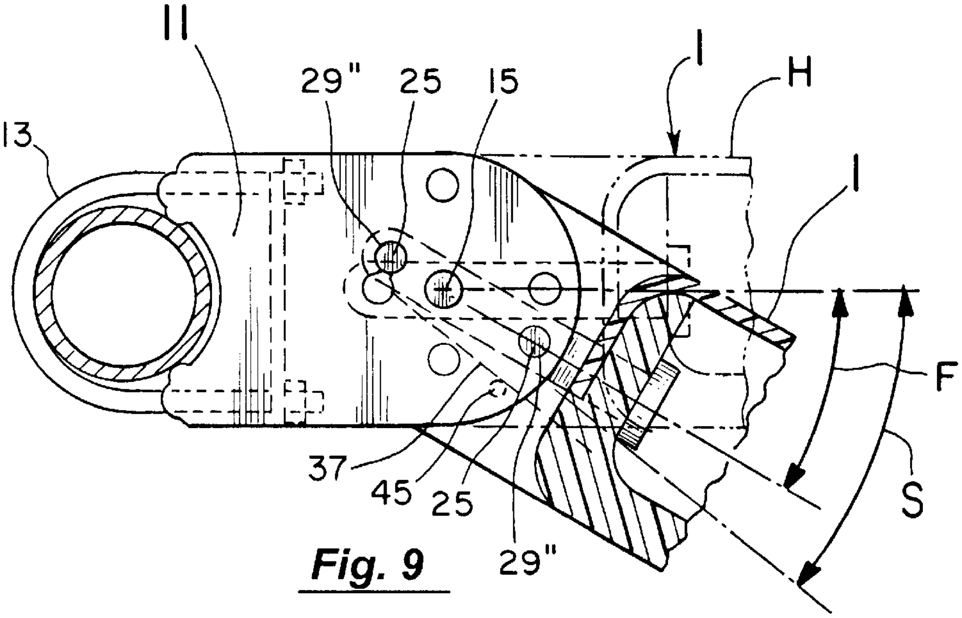
FIG. 9 is a view similar to FIGS. 4 and 7 but showing the manner in which the speaker box 1 can be moved from its horizontal position to a position facing slightly toward the front of the vehicle.

In the preferred embodiment, the speaker box 1 is adjustable to assume at least the three positions shown in FIG. 8. In the up or vertical position V, the sound from the speaker box 1 as indicated above is directed rearwardly of the vehicle 4. In the horizontal position H shown in full lines in FIG. 8, the speaker box 1 is directed downwardly as in conventional designs. This places the speaker box 1 as discussed above in an out-of-the-way position for maximum use of the interior space of the vehicle 4. It also enables a removable soft or hard top to be placed on the vehicle 4. The third or forward position F illustrated in FIG. 8 shows the speaker box 1 at about a 30 degree angle from the horizontal position H. In this position F, the speaker box 1 is facing slightly toward the front of the vehicle 4 to direct the sound from the speaker box 1 slightly forward for more enjoyment by the drive and front passenger in the cabin area 10. This movement of the speaker box 1 to position F from position H is accomplished as illustrated in FIG. 9 in the same manner as the movement from position V to position H was described above. In the position F, the detents 25 are then engaged in the pair of holes 29" in the plate 11. The pair of holes 29" as shown are spaced from and about the rotational axis 19 of the rod 15 as are the respective pairs 29' and 29 as illustrated in FIGS. 4 and 7. The pairs of holes are for additional strength and there could be just a single set of holes 29, 29', and 29" in each plate 11 if desired. Similarly, each support member 37 for the speaker box 1 preferably has two holes 39 selectively alignable with the pairs of holes in each plate 11 but the support member 37 could have only a single hole 39 spaced from the rotational axis 19 and selectively alignable with the holes in the plate 11 if desired. Each cross piece 27 in this regard is also preferably provided with a pair of detents 25 but a single one could be used. If so, the cross piece 27 would then only need to extend in one direction outwardly of the axis 19 of the rod 15.

Figure 10:
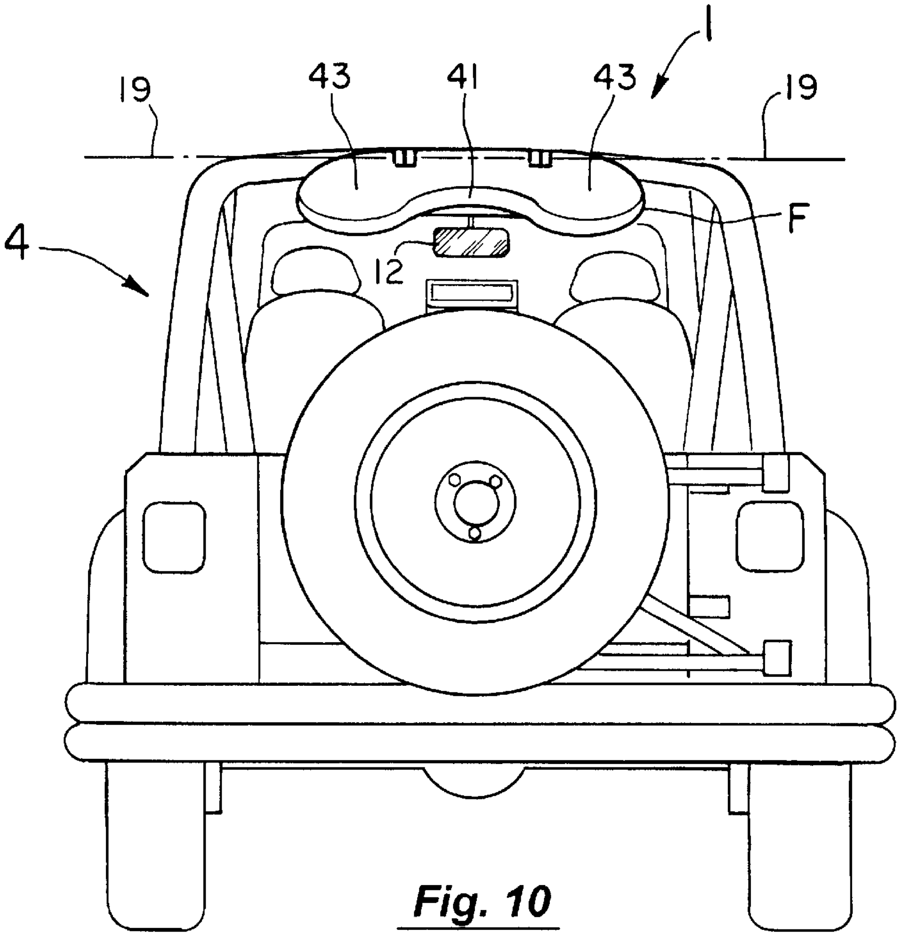
FIG. 10 is a view taken along line 10—10 of FIG. 8 showing the saddle or cutout in the recessed middle section of the speaker box that permits the driver to see through the rear mirror passed the speaker box even with the speaker box is in its forward facing position.

Referring again to FIG. 8 and in the slightly forward facing position F shown in this view, it is important that the speaker box 1 not unduly inhibit the vision of the driver through the rear view mirror 12 along the line of sight path 14 toward the rear of the vehicle 4. To accomplish this, the speaker box 1 as illustrated throughout (e.g., see FIG. 2) is preferably provided with a recessed middle portion 41. This saddle or cutout portion 41 as best seen in FIG. 10 enables the driver to still see passed the speaker box 1 out the rear of the vehicle 4 with the speaker box 1 in the forward position F. In this regard, the recessed middle portion 41 extends outwardly of the pivotal axis 19 for a distance less than the distances the spaced-apart side sections 43 do. With both the rear view mirror 12 and recessed middle portion 41 of the speaker box 1 centrally located across or transversely of the vehicle 4, the recessed middle portion 41 then permits the driver to still see rearwardly of the vehicle 4 through the rear vision mirror 12 with the speaker box 1 in the forward position F. In other words and with the speaker box 1 in the forward facing potion F of FIGS. 8 and 10, the line of sight path 14 still passes below the recessed middle portion 41 and between the two side sections 43.

It is noted that an additional safety feature is provided in the adjustable mechanism 9 to stop the speaker box 1 from pivoting too far forward. This feature is best illustrated in FIG. 9 in which a stop post 45 is provided on each fixed plate 11 (see also FIG. 3). In operation and should the speaker box 1 inadvertently fall or slip passed the desired position F in FIG. 9, the support member 37 for the speaker box 1 will abut and be stopped by the post 45 in the safety position S of FIG. 9. With certain modifications to the preferred design of the speaker box 1 (e.g., reducing the size of the recessed middle portion 41 and/or the entire size of the speaker box 1 including the sections 41 and 43), the speaker box 1 may be allowed to swing to a position facing directly toward the front of the vehicle 4 and the driver still be able to see passed it. However, it is preferred that the downward rotation of the speaker box 1 be limited as disclosed above.

Figure 11:
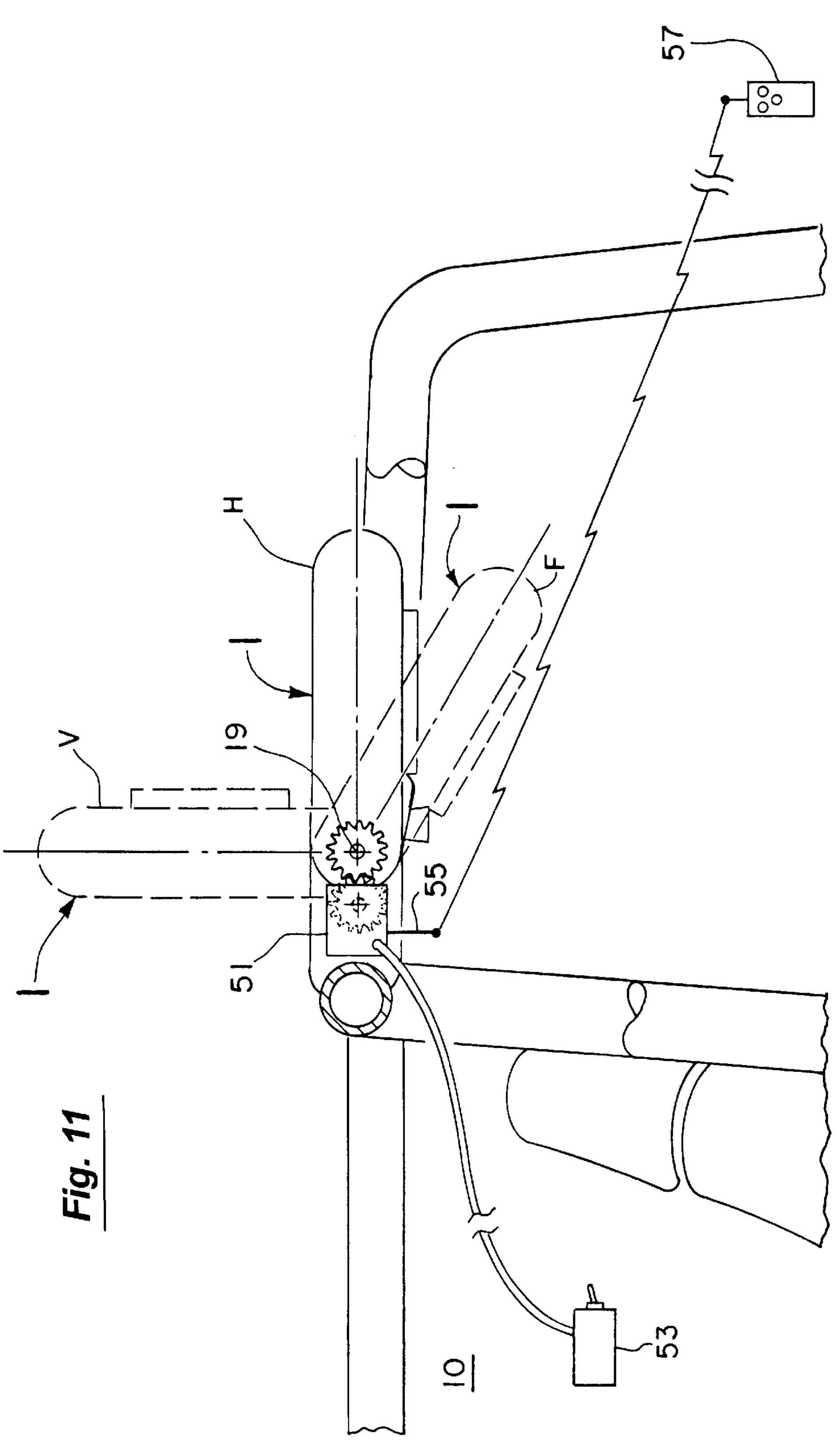
FIG. 11 illustrates the provision of a remotely controllable motor to pivot the speaker box to its various positions.
Figure 12:
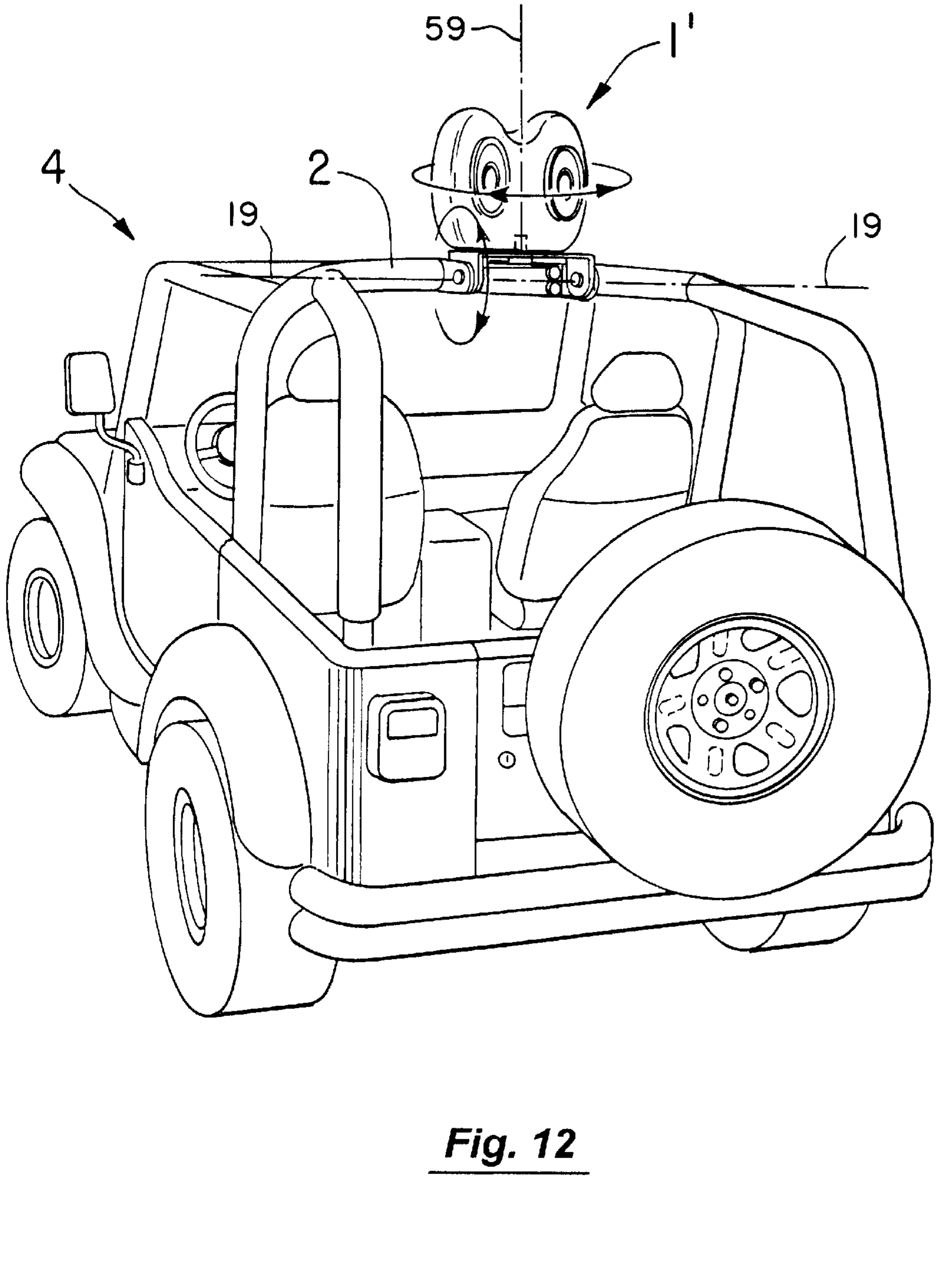
FIG. 12 is a perspective view showing how the speaker box of the present invention can also be pivoted about a vertical axis to further direct its sound as desired.

Referring to FIG. 11, the pivotal movement of the speaker box 1 about the horizontal axis 19 could be done by using a power drive if desired such as the simple gear motor arrangement 51 of FIG. 11. The motor 51 could then be remotely controlled by an electronic actuator or switch 53 located in the vehicle cabin 10 as schematically illustrated in FIG. 11. The motor 51 could also be remotely controlled by radio or other electromagnetic waves received by the antenna 55 from a generating source or actuator that was in the cabin 10 or part of a portable, handheld unit such as 57. The portable unit 57 in this regard could additionally be used to remotely control the volume and other operations of the speaker box 1. The speaker box 1 could also be mounted as illustrated in FIG. 12 for pivotal movement about a vertical axis 59 in place of or preferably in addition to the horizontal axis 19. Such movement as in FIG. 11 could be remotely controlled if desired from within the vehicle cabin 10 or from a location outside the vehicle 4.

Figure 13:
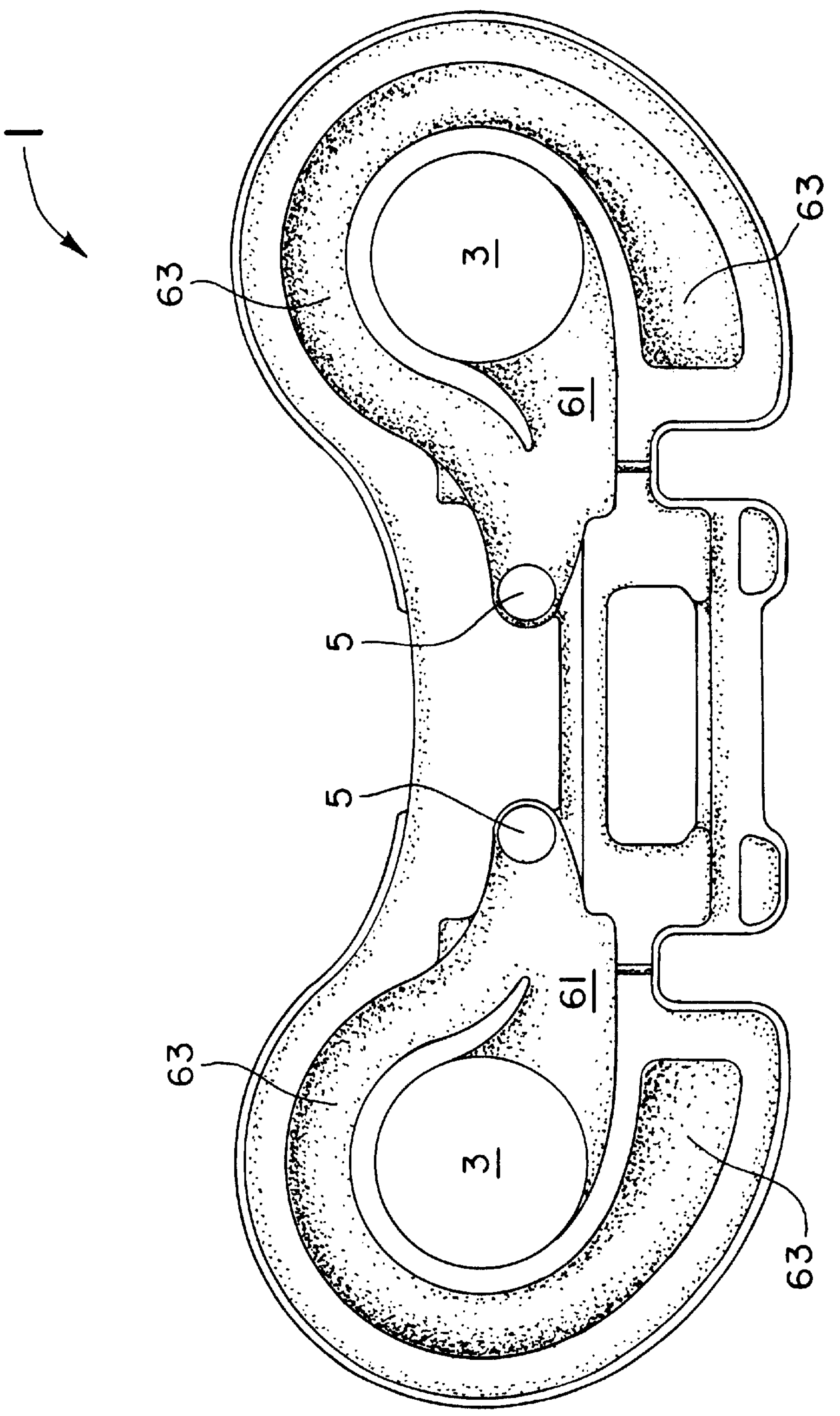
FIG. 13 is a cross sectional view of the speaker box of the present invention illustrating the resonance chambers.

FIG. 13 is a cross sectional view of the speaker box 1 illustrating the mid-frequency resonance chamber 61 on each side and the surrounding resonance chamber 63 for the bass or lower frequencies. As shown, both the mid-frequency and bass are directed to exit the speaker box through the respective ports 5. The enlarged and curved horn of each resonance chamber 63 has been found to particularly enhance the quality of the bass sounds from the speaker box 1.

While several embodiments of the present invention have been shown and described in detail, it to be understood that various changes and modifications could be made without departing form the scope of the invention.

We claim:

1. In a vehicle having a cabin area with at least one seat, at least four wheels, and a bar extending laterally across the vehicle at a position above the seat and substantially between the front and rear of the vehicle, the improvement including a speaker box mountable to the bar at a first location for pivotal movement about a substantially horizontal axis between at least two different positions relative to the bar.

2. The improvement of claim 1 wherein said speaker box is directed substantially downwardly when said speaker box is in a first of said at least two positions and directed substantially rearwardly of the vehicle in a second of said at least two positions.

3. The improvement of claim 1 further including an adjustable mechanism to allow said speaker box to be selectively moved between said at least two positions.

4. The improvement of claim 3 wherein said adjustable mechanism includes first and second members, said first member being fixedly attached to said bar and said second member being mounted to said speaker box for selective movement with said speaker box relative to said first member about said horizontal axis.

5. The improvement of claim 4 wherein said first and second members are selectively engagable and disengagable with each other wherein said first and second members can be engaged with each other to secure said speaker box in a first of said at least two positions and disengaged from each other to move said speaker box from said first of said at least two positions to a second of said at least two positions.

6. The improvement of claim 5 wherein said first and second members are selectively engagable with each other to secure said speaker box in said second of said at least two positions.

7. The improvement of claim 6 wherein one of said first and second members includes at least two holes spaced from each other about an axis and the other of said first and second members includes at least one hole spaced from an axis and selectively alignable with each of the holes of the one member.

8. The improvement of claim 7 further including at least one detent selectively receivable in said aligned holes to secure said speaker box selectively in each of said at least two positions.

9. The improvement of claim 6 wherein one of said first and second members includes at least two holes spaced from each other about an axis and the other of said first and second members includes at least one detent selectively receivable in each of said at least two holes.

10. In a vehicle having a cabin area with at least one seat, at least four wheels, and a bar extending laterally across the vehicle at a position above the seat and substantially between the front and rear of the vehicle, the improvement including a speaker box mountable to the bar for pivotal movement about a substantially horizontal axis between at least two positions and further including an adjustable mechanism to allow said speaker box to be selectively moved between said at least two positions, said adjustable mechanism including first and second members, said first member being fixedly attached to said bar and said second member being mounted to said speaker box for selective movement with said speaker box relative to said first member about said horizontal axis, said first and second members being selectively engagable and disengagable with each other wherein said first and second members can be engaged with each other to secure said speaker box in a first of said at least two positions and disengaged from each other to move said speaker box from said first of said at least two positions to a second of said at least two positions, said first and second members being selectively engagable with each other to secure said speaker box in said second of said at least two positions wherein one of said first and second members includes at least two holes spaced from each other about an axis and the other of said first and second members includes at least one detent selectively receivable in each of said at least two holes and wherein said one of said first and second members includes a plate and the other of said first and second members includes a rod slidably mounted for movement along the longitudinal axis thereof.

11. In a vehicle having a sports bar, the improvement including a speaker box mountable to the sports bar for pivotal movement about a substantially horizontal axis between at least two positions and further including an adjustable mechanism to allow said speaker box to be selectively moved between said at least two positions, said adjustable mechanism including first and second members, said first member being fixedly attached to said sports bar and said second member being mounted to said speaker box for selective movement with said speaker box relative to said first member about said horizontal axis, said first and second members being selectively engagable and disengagable with each other wherein said first and second members can be engaged with each other to secure said speaker box in a first of said at least two positions and disengaged from each other to move said speaker box from said first of said at least two positions to a second of said at least two positions, said first and second members being selectively engagable with each other to secure said speaker box in said second of said at least two positions wherein one of said first and second members includes at least two holes spaced from each other about an axis and the other of said first and second members includes at least one detent selectively receivable in each of said at least two holes and wherein said one of said first and second members includes a plate and the other of said first and second members includes a rod slidably mounted for movement along the longitudinal axis thereof wherein the other of said first and second members further includes a cross piece attached to said rod to extend outwardly of said rod and the longitudinal axis thereof, said cross piece having said detent thereon, said detent being spaced from said longitudinal axis and being selectively receivable in each of said at least two holes of said first plate by sliding said rod and cross piece attached thereto along said longitudinal axis toward and away from said plate to selectively engage and disengage the detent with the holes in said plate.

12. In a vehicle having a sports bar, the improvement including a speaker box mountable to the sports bar for pivotal movement about a substantially horizontal axis between at least two positions and further including an adjustable mechanism to allow said speaker box to be selectively moved between said at least two positions, said adjustable mechanism including first and second members, said first member being fixedly attached to said sports bar and said second member being mounted to said speaker box for selective movement with said speaker box relative to said first member about said horizontal axis, said first and second members being selectively engagable and disengagable with each other wherein said first and second members can be engaged with each other to secure said speaker box in a first of said at least two positions and disengaged from each other to move said speaker box from said first of said at least two positions to a second of said at least two positions, said first and second members being selectively engagable with each other to secure said speaker box in said second of said at least two positions wherein one of said first and second members includes at least two holes spaced from each other about an axis and the other of said first and second members includes at least one detent selectively receivable in each of said at least two holes and wherein said one of said first and second members includes a plate and the other of said first and second members includes a rod slidably mounted for movement along the longitudinal axis thereof and further including a handle mounted to said rod and extending outwardly of the longitudinal axis of said rod wherein said handle can be manually operated to move the rod along the longitudinal axis thereof.

13. The improvement of claim 5 wherein said first and second members are biased to engage one another.

14. In a vehicle having a sports bar, the improvement including a speaker box mountable to the sports bar for pivotal movement about a substantially horizontal axis between at least two positions and further including an adjustable mechanism to allow said speaker box to be selectively moved between said at least two positions, said adjustable mechanism including first and second members, said first member being fixedly attached to said sports bar and said second member being mounted to said speaker box for selective movement with said speaker box relative to said first member about said horizontal axis wherein said adjustable mechanism includes third and fourth members, said third member being fixedly attached to said sports bar and said fourth member being mounted to said speaker box for selective movement with said speaker box relative to said third member about said horizontal axis.

15. The improvement of claim 14 wherein said third and fourth members are selectively engagable and disengagable with each other wherein said third and fourth members can be engaged with each other to secure said speaker box in said first of said at least two positions and disengaged from each other to move said speaker box from said first of said at least two positions to said second of said at least two positions and wherein said third and fourth members are selectively engagable with each other to secure said speaker box in said second of said at least two positions.

16. The improvement of claim 15 wherein one of said first and second members and one of said third and fourth members respectively include a rod member slidable mounted for movement along the respective longitudinal axis of said rod wherein said longitudinal axes of said rods are collinear.

17. The improvement of claim 16 wherein said rods are longitudinally spaced from each other along said collinear axis and are biased apart from each other along said collinear axis.

18. The improvement of claim 1 wherein said speaker box is mounted to said bar for pivotal movement about a substantially horizontal axis among at least three positions.

19. The improvement of claim 18 wherein said speaker box is directed downwardly in a first of said at least three positions, directed rearwardly of the vehicle in a second of said at least three positions, and directed at least slightly toward the front on the vehicle in a third of said at least three positions.

20. In a vehicle having a sports bar, the improvement including a speaker box mountable to the sports bar for pivotal movement about a substantially horizontal axis between at least two positions and wherein the pivotal movement of said speaker box about said horizontal axis is remotely controlled.

21. The improvement of claim 20 wherein the pivotal movement of said speaker box about said horizontal axis is remotely controlled by an electronic actuator.

22. The improvement of claim 20 wherein said vehicle has a cabin and the pivotal movement of said speaker box about said horizontal axis is remotely controlled by an actuator positioned in said cabin.

23. The improvement of claim 20 wherein the pivotal movement of said speaker box about said horizontal axis is remotely controlled by an electromagnetic wave actuator.

24. The improvement of claim 23 wherein the volume of said speaker box is remotely controlled by said electromagnetic wave actuator.

25. The improvement of claim 1 wherein said speaker box is further mounted for pivotal movement relative to said bar about a substantially vertical axis.

26. In a vehicle having a sports bar, the improvement including a speaker box mountable to the sports bar for pivotal movement about a substantially horizontal axis between at least two positions wherein said speaker box is further mounted for pivotal movement relative to said sports bar about a substantially vertical axis and wherein said pivotal movement about said vertical axis is remotely controlled.

27. The improvement of claim 1 further including a rear view mirror centrally located across the cabin area of the vehicle with a line of sight path toward the rear of the vehicle wherein said speaker box has at least two side sections spaced apart from each other along said horizontal axis and a recessed middle portion between said two side sections, said recessed middle portion extending outwardly of the horizontal axis for a distance less than the distances the spaced-apart side sections extend outwardly of the horizontal axis wherein said line of sight path of said rear view mirror with said speaker box in one of said two positions passes below said recessed middle portion and between said two side sections.

* * * * *